(12) United States Patent
Shin

(10) Patent No.: US 11,363,827 B2
(45) Date of Patent: Jun. 21, 2022

(54) FEED COMPOSITION USING PERILLA MEAL AND METHOD FOR PRODUCING THEREOF

(71) Applicants: AGRICULTURAL COMPANY CORPORATIONS GREEN GRASS FEED CO. LTD., Jecheon-si (KR); Seung ho Shin, Chungju-si (KR)

(72) Inventor: Seung ho Shin, Chungju-si (KR)

(*) Notice: Subject to any disclaimer, the term of this patent is extended or adjusted under 35 U.S.C. 154(b) by 87 days.

(21) Appl. No.: 16/522,918

(22) Filed: Jul. 26, 2019

(65) Prior Publication Data

US 2020/0029593 A1 Jan. 30, 2020

Related U.S. Application Data

(62) Division of application No. 15/829,906, filed on Dec. 2, 2017, now abandoned.

(30) Foreign Application Priority Data

Dec. 2, 2016 (KR) .......................... 10-2016-0163840

(51) Int. Cl.
| | | |
|---|---|---|
| A23K 10/30 | (2016.01) | |
| A23K 40/00 | (2016.01) | |
| A23K 10/18 | (2016.01) | |
| A23K 10/12 | (2016.01) | |
| A23K 20/20 | (2016.01) | |
| A23K 50/10 | (2016.01) | |
| A23K 10/33 | (2016.01) | |

(Continued)

(52) U.S. Cl.
CPC .............. *A23K 10/30* (2016.05); *A23K 10/12* (2016.05); *A23K 10/18* (2016.05); *A23K 10/33* (2016.05); *A23K 10/37* (2016.05); *A23K 20/20* (2016.05); *A23K 20/24* (2016.05); *A23K 20/30* (2016.05); *A23K 40/00* (2016.05); *A23K 50/10* (2016.05); *Y02P 60/87* (2015.11)

(58) Field of Classification Search
CPC ........ A23K 10/12; A23K 10/18; A23K 20/20; A23K 10/30; A23K 10/33; A23K 20/30; A23K 50/10; A23K 40/00; A23K 20/24; Y02P 60/87
USPC ......................................................... 426/54
See application file for complete search history.

(56) References Cited

FOREIGN PATENT DOCUMENTS

| | | |
|---|---|---|
| KR | 1019830001043 | 10/1984 |
| KR | 101166313 | 7/2012 |

(Continued)

OTHER PUBLICATIONS

JP2005218458A-machine translation of abstract and description (Year: 2005).*

(Continued)

*Primary Examiner* — Subbalakshmi Prakash
(74) *Attorney, Agent, or Firm* — Revolution IP, PLLC

(57) ABSTRACT

The present invention relates to a feed composition using perilla meal, in which the ratio of omega-3 (omega-3) fatty acid and omega-6 (omega-6) fatty acid is adjusted to 1:4 or less to obtain livestock products, such as meat or milk, containing a large amount of unsaturated fatty acid. More specifically, the present invention related to a feed composition using perilla meal to produce livestock products with the ratio of omega-3 to omega-6 fatty acids being 1:4 or less which is a recommended ratio of the World Health Organization (WHO).

1 Claim, 11 Drawing Sheets

(51) Int. Cl.
*A23K 20/24* (2016.01)
*A23K 10/37* (2016.01)

(56) References Cited

FOREIGN PATENT DOCUMENTS

| KR | 101267835 | 5/2013 |
| KR | 1020140005004 | 1/2014 |

OTHER PUBLICATIONS

CN103478414A-machine translation of abstract and description (Year: 2014).*

* cited by examiner

FIG. 1

Component analysis for perilla meal

| Analysis item | Unit | | Requested samples (Dry matter basis) | Requested samples (Original basis) | Remark/Overall average (Original basis) |
|---|---|---|---|---|---|
| Moisture | MOIS. | % | 0.00 | 12.63 | - |
| Crude protein | PROT | % | 15.20 | 13.28 | - |
| Crude fat | FAT | % | 2.99 | 2.61 | - |
| Crude fiber | FIB | % | 31.90 | 27.87 | - |
| Crude ash | ASH | % | 8.80 | 7.69 | - |
| Calcium | Ca | % | 0.54 | 0.47 | - |
| phosphorus | P | % | 0.26 | 0.23 | - |
| Acid detergent insoluble fiber | ADF | % | 35.63 | 31.13 | - |
| Neutral detergent insoluble fiber | NDF | % | 50.41 | 44.04 | - |
| Solubilised protein* | RSP* | % | 7.60 | 6.64 | - |
| Degradable protein * | RDP* | % | 12.16 | 10.62 | - |
| Undegradable protein * | RUP* | % | 3.04 | 2.66 | - |
| Nonfibrous carbohydrate * | NFC* | % | 22.61 | 19.75 | - |
| Nitrogen free extract * | NFE* | % | 41.11 | 35.92 | - |
| Total digestible nutrients * | TDN* | % | 60.14 | 52.54 | - |
| Dry matter * | DM* | % | 100.00 | 87.37 | - |
| Metabolic protein * | MP* | % | 11.10 | 9.69 | - |
| Metabolic energy * | ME* | Mcal/kg | 2.16 | 1.89 | - |
| Net energy-laction * | NEL* | Mcal/kg | 1.38 | 1.20 | - |
| Roughage * | Roughage * | % | 100.00 | 87.37 | - |
| NDF from roughage* | fNDF* | % | 50.41 | 44.04 | - |
| Masticatory factor index * | wMFI* | | 97.13 | 84.87 | - |

FIG. 2

Analysis of fatty acids in perilla meal

| | Fatty acid name | | Fatty acid composition (g/100g) |
|---|---|---|---|
| Saturated fatty acid | Capric acid | C10:0 | 0 |
| | Lauric acid | C12:0 | 0.01 |
| | Myristic acid | C14:0 | 0.04 |
| | Pentadecanoic acid | C15:0 | 0.01 |
| | Palmitic acid | C16:0 | 6.81 |
| | Magaric acid | C17:0 | 0.14 |
| | Stearic acid | C18:0 | 2.28 |
| | Arachidic acid | C20:0 | 0.14 |
| | Sum of saturated fatty acid | | 9.43 |
| Unsaturated fatty acid | Myristoleic acid | C14:1 | 0.01 |
| | Pentadecenoic acid | C15:1 | 0.01 |
| | Palmitoleic acid | C16:1 | 0.1 |
| | Magaoleic acid | C17:1 | 0.05 |
| | Oleic acid | C18:1 | 16.04 |
| | Linoleic acid | C18:2n6 | 15.6 |
| | Linolenic acid | C18:3n3 | 58.05 |
| | Stearodonic acid | C18:4n3 | 0.21 |
| | Eicosenoic acid | C20:1n9 | 0 |
| | Eicosadienoic acid | C20:2n6 | 0 |
| | Eicosatrienoic acid | C20:3n6 | 0 |
| | Arachidonic acid | C20:4n6 | 0 |
| | Sum of unsaturated fatty acid | | 90.07 |

FIG. 3

Formulating ratio of a feed composition
(A fattening period and milking period)

| Name of a raw ingredient | Ratio(%) |
|---|---|
| Roughage | 20~40 |
| Perilla meal | 6~8 |
| Additional ingredient | 20~55 |
| Probiotics | 0.5~1.5 |

FIG. 5

| | Analysis of fatty acids in a feed composition | | |
|---|---|---|---|
| | Fatty acid name | | Fatty acid composition (g/100g) |
| Saturated fatty acid | Capric acid | C10:0 | 0 |
| | Lauric acid | C12:0 | 0.1 |
| | Myristic acid | C14:0 | 0.27 |
| | Pentadecanoic acid | C15:0 | 0.08 |
| | Palmitic acid | C16:0 | 12.67 |
| | Magaric acid | C17:0 | 0.09 |
| | Stearic acid | C18:0 | 2.39 |
| | Arachidic acid | C20:0 | 0.78 |
| | Sum of saturated fatty acid | | 16.38 |
| Unsaturated fatty acid | Myristoleic acid | C14:1 | 0.02 |
| | Pentadecenoic acid | C15:1 | 0.03 |
| | Palmitoleic acid | C16:1 | 0.29 |
| | Magaoleic acid | C17:1 | 0.03 |
| | Oleic acid | C18:1 | 20.98 |
| | Linoleic acid | C18:2n6 | 28.38 |
| | Linolenic acid | C18:3n3 | 25.97 |
| | Stearodonic acid | C18:4n3 | 0.38 |
| | Eicosenoic acid | C20:1n9 | 0.31 |
| | Eicosadienoic acid | C20:2n6 | 0 |
| | Eicosatrienoic acid | C20:3n6 | 0 |
| | Arachidonic acid | C20:4n6 | 0 |
| | Sum of unsaturated fatty acid | | 76.39 |
| omega-3:omega-6 | | | 1 : 1.08 |

FIG. 6

Component analysis according to formulation (A fattening period and milking period)

| Analysis item | Unit | | Requested samples (Dry matter basis) | Requested samples (Original basis) | Remark/Overall average (Original basis) |
|---|---|---|---|---|---|
| Moisture | MOIS. | % | 0.00 | 43.33 | 43.65 |
| Crude protein | PROT | % | 16.12 | 9.13 | 8.74 |
| Crude fat | FAT | % | 6.35 | 3.60 | 2.56 |
| Crude fiber | FIB | % | 20.19 | 11.44 | 10.47 |
| Crude ash | ASH | % | 9.35 | 5.30 | 5.41 |
| Calcium | Ca | % | 0.86 | 0.49 | 0.44 |
| phosphorus | P | % | 0.70 | 0.40 | 0.32 |
| Acid detergent fiber | ADF | % | 26.44 | 14.98 | 15.66 |
| Neutral detergent fiber | NDF | % | 50.42 | 28.57 | 26.15 |
| Solubilised protein * | RSP* | % | 5.16 | 2.92 | 2.80 |
| Degradable protein * | RDP* | % | 9.99 | 5.66 | 5.41 |
| Undegradable protein * | RUP* | % | 6.12 | 3.47 | 3.32 |
| Nonfibrous carbohydrate * | NFC* | % | 17.77 | 10.07 | 13.49 |
| Nitrogen free extract * | NFE* | % | 48.00 | 27.20 | 29.17 |
| Total digestible nutrients * | TDN* | % | 71.95 | 40.77 | 39.66 |
| Dry matter * | DM* | % | 100.00 | 56.67 | 56.35 |
| Metabolic protein * | MP* | % | 11.28 | 6.39 | 6.12 |
| Metabolic energy * | ME* | Mcal/kg | 2.41 | 1.37 | 1.32 |
| Net energy-laction * | NEL* | Mcal/kg | 1.65 | 0.93 | 0.91 |
| Roughage * | Roughage* | % | 50.00 | 28.34 | 28.17 |
| NDF from roughage * | fNDF* | % | 25.21 | 14.29 | 13.07 |
| Masticatory factor index* | wMFI* | | 50.28 | 28.50 | 26.66 |

FIG. 7

Changes in unsaturated fatty acids after feeding a feed

| | Feeding period | 6 Month | 7 Month | 7 Month | 7 Month | 8 Month | 8 Month | 8 Month | 9 Month | 9 Month |
|---|---|---|---|---|---|---|---|---|---|---|
| | Slaughter and analysis | 15,10,15 | 15,11,11 | 15,11,28 | 15,12,11 | 16,0 1,14 | 16,0 1,27 | 16,0 2,21 | 16,0 2,16 | 16,0 2,34 |
| Saturated fatty acid | Saturated fatty acid +179,193 | 0 | 0 | 0 | 0 | 0 | 0 | 0.03 | 0.04 | 0.03 |
| | Lauric acid | 0.18 | 0.02 | 0.16 | 0.04 | 0.11 | 0.18 | 0.07 | 0.17 | 0.14 |
| | Myristic acid | 4.59 | 3.89 | 4.83 | 5.18 | 4.2 | 4.33 | 1.93 | 4.08 | 3.94 |
| | Pentadecanoic acid | 0.33 | 0.28 | 0.38 | 0.34 | 0.28 | 0.31 | 0.16 | 0.35 | 0.31 |
| | Palmitic acid | 25.36 | 25.31 | 24.75 | 26.06 | 24.83 | 23.55 | 18.15 | 22.52 | 22.18 |
| | Magaric acid | 0.44 | 0.54 | 0.51 | 0.48 | 0.47 | 0.5 | 0.53 | 0.25 | 0.23 |
| | Stearic acid | 8.23 | 7.01 | 5.84 | 6.08 | 5.6 | 5.88 | 12.88 | 3.9 | 3.88 |
| | Arachidic acid | 0.34 | 0.38 | 0.28 | 0.3 | 0.44 | 0.42 | 0.41 | 0.43 | 0.36 |
| | Sum of saturated fatty acid | 39.47 | 38.82 | 36.55 | 38.48 | 35.93 | 34.83 | 35.93 | 31.73 | 30.17 |
| Unsaturated fatty acid | Myristoleic acid | 2.14 | 1.94 | 3.89 | 2.58 | 2.81 | 2.98 | 0.27 | 3.65 | 3.37 |
| | Pentadecenoic acid | 0.17 | 0.15 | 0.12 | 0.18 | 0.15 | 0.16 | 0.08 | 0.14 | 0.13 |
| | Palmitoleic acid | 5.86 | 5.98 | 7.65 | 8.48 | 7.9 | 7.64 | 2.31 | 9.17 | 8.9 |
| | Magaoleic acid | 0 | 0.35 | 0.43 | 0.3 | 0.32 | 0.3 | 0.45 | 0.59 | 0.65 |
| | Oleic acid | 44.25 | 47.31 | 42.88 | 42.84 | 46.63 | 46.38 | 53.75 | 46.67 | 48.39 |
| | Linoleic acid | 3.86 | 3.27 | 2.87 | 2.2 | 3.48 | 3.61 | 4.37 | 3.79 | 3.97 |
| | Linolenic acid | 1.03 | 1.14 | 0.86 | 1.08 | 1.11 | 1.22 | 0.79 | 1.29 | 1.88 |
| | Stearodonic acid | 0.08 | 0.06 | 0.02 | 0.06 | 0.06 | 0.05 | 0.08 | 0.24 | 0.23 |
| | Eicosenoic acid | 0.02 | 0.03 | 0.02 | 0.02 | 0.06 | 0.08 | 0.07 | 0.1 | 0.08 |
| | Eicosadienoic acid | 0 | 0 | 0 | 0 | 0 | 0 | 0 | 0 | 0 |
| | Eicosatrienoic acid | 0 | 0 | 0 | 0 | 0 | 0 | 0 | 0 | 0 |
| | Arachidonic acid | 0 | 0 | 0 | 0 | 0 | 0 | 0 | 0 | 0 |
| | Sum of unsaturated fatty acid | 57.4 | 60.2 | 58.9 | 58.7 | 61.7 | 62.4 | 61.8 | 65.6 | 66.8 |
| | Ratio of omega-9 omega-6 | 13.74 | 12.72 | 13.26 | 11.93 | 12.97 | 12.84 | 15.2 | 12.48 | 13.01 |

FIG. 9B

Result of a cattle carcass grading

Name of shipping the product: Kim Jong Ye  Address: 621-1, Samchang-ri, Juduk-eup, Chungju-si, Chungbuk
Work station name: Bak Dal Jae LPC  Determination Date: October 13, 2015

| No. | Work station | Date of slaughter | | Carcass number | Variety | Sex | Yield | | | | Grading correction Yield grade | Meat quality | | | | | Defect | Final grade | auctioning price (won/kg) | barcode | Image information |
|---|---|---|---|---|---|---|---|---|---|---|---|---|---|---|---|---|---|---|---|---|---|
| | | Month | Day | | | | Backfat thickness (mm) | Sirloin area (㎡) | Carcass weight (kg) | Yield index | | Intramuscular fat (Number) | Meat color (Number) | Fat color (Number) | Texture (Number) | Maturity (Number) | Meat quality grade | | | | |
| 1 | Bak Dal Jae LPC | 10.12 | 10 | 13 | 40 | Hanwoo | Geo | 12 | 86 | 401 | 55.47 | B | 0 | 5 | 3 | 1 | 3 | 1+ | 1+B | | 0023027375595 | |
| 2 | Bak Dal Jae LPC | 10.12 | 10 | 13 | 43 | Hanwoo | Geo | 9 | 79 | 405 | 66.33 | B | 5 | 5 | 3 | 1 | 2 | 1 | 1B | | 0023027507101 | |
| 3 | Bak Dal Jae LPC | 10.12 | 10 | 13 | 44 | Hanwoo | Geo | 33 | 90 | 446 | 51.78 | C | 5 | 5 | 3 | 1 | 2 | 1 | 1C | | 0023027573337 | |
| average | | | | | Hanwoo | Geo | 18 | 85 | 417 | 61.2 | | | 5 | 5 | 3 | 1 | 2 | | | | | |

Korea Institute for Animal Product Quality Evaluation (www.ekape.or.kr) Tel:(044)410-7000 Fax:(044)410-7179

FEED COMPOSITION USING PERILLA MEAL AND METHOD FOR PRODUCING THEREOF

CROSS-REFERENCE TO RELATED APPLICATIONS

This patent application is a divisional application of U.S. patent application Ser. No. 15/829,906 filed on Dec. 2, 2017, which claims priority under 35 U.S.C. § 119 to Korean Patent Application No. 10-2016-0163840 filed on Dec. 2, 2016, the entire contents of which are incorporated by reference herein.

TECHNICAL FIELD

The present invention relates to a feed composition using perilla meal, in which by adjusting the ratio of omega-3 (ω-3) fatty acid and omega-6 (ω-6) fatty acid to 1:4 or less, it is possible to obtain livestock products, such as meat or milk produced at low cost, while containing a large amount of unsaturated fatty acid.

BACKGROUND

Generally, to raise livestock such as chickens, pigs, cattle, etc., a variety of formulated diets containing suitable nutrients are commonly used to maintain the health of livestock and to fully demonstrate the livestock's production capacity.

As a result, excessive fat is accumulated in the livestock products, resulting in a serious imbalance of omega-3 fatty acid (ω-3) and omega-6 (ω-6) in the body when people ingested it. Such an imbalance caused various cardiovascular diseases, which became a social issue. Accordingly, many researches have been conducted on the mixture of grain feeds.

Previously, a feed composition containing flax related products, e.g., flax seed, flax oil, or flax marc, was prepared and fed to raise livestock. A technology to produce livestock products with a balance of omega-3 (ω-3) and omega-6 (ω-6) of 1:4 or less was introduced in the livestock market of Republic of Korea, but unlike the theory, it failed in the commercialization.

In order to satisfy such a requirement, in a related art regarding a feed to raise livestock, a technology to produce livestock products with a balance of omega-3 (ω-3) and omega-6 (ω-6) of 1:4 or less has emerged in the livestock market in Republic of Korea, resulting from a feed composition containing flax related products, such as flax seed, flax oil, or flax marc. An example thereof is disclosed in Korean patent No. 10-1267835 (published on May 27, 2013) entitled "FEED COMPOSITION COMPRISING FERMENT OF GINKGO LEAVES CAKE AND PREPARATION METHOD THEREOF."

The aforementioned feed composition includes 20 to 30% by weight of a ginkgo leaves marc fermented product, 20 to 30% by weight of a whole flax seed fermented product, and 1 to 10% by weight of fermented rice. The fermented products of ginkgo leaves, whole flax seeds, and rice bran are produced with a fermented product of bacillus bacteria and lactic acid bacteria, thereby enhancing the omega 3 content.

However, the feed composition of the related art uses an expensive ingredient (especially flax seeds) among the ingredients used for enhancing the omega content, which increases the cost of feed and thereby makes it impossible for livestock raisers to use them. Eventually, the feed composition has never been realized in practice.

Also, it lacks flavor for livestock and the livestock raisers are reluctant to use it due to the dropped feed palatability. This gives rise to a reduced amount of milk for milk cattle, or a poor fattening or a poor grade for Korean native cattle, which has eventually driven profit loss of producers.

SUMMARY

The present invention has been proposed in order to solve the problems of the prior art as described above. It is an object of the present invention to provide a feed composition and a method for producing thereof, in which it is possible to easily and inexpensively produce meat, milk, etc. by preparing a feed having a ratio of omega-3 fatty acid and omega-6 fatty acid adjusted to 1:4 or less at low cost and feeding it to the livestock (cattle or milk cattle), and at the same time, it is possible to produce livestock products containing a large amount of unsaturated fatty acid in the livestock body.

In order to solve the technical problems as described above, a feed composition using perilla meal according to the present invention includes, for a 100 parts by weight of a feed composition, 20 to 40 parts by weight of roughage containing at least any one of oats or rice straws, 6 to 8 parts by weight of shredded perilla meal having a diameter of 1.5 to 2.5 mm, 20 to 55 parts by weight of one or more additional ingredients selected among grains, salts, minerals, and calcium carbonate, and 0.5 to 1.5 parts by weight of probiotics; wherein the perilla meal is obtained such that the perilla meal is shredded to have a set size of 1.5 to 2.5 mm in diameter and the ratio of omega-3 fatty acid and omega-6 fatty acid in at lease any one livestock products of meat or milk obtained from livestock is 1:4 or less, wherein at least any one of sugars, salts, and molasses is added to the perilla meal, and the perilla meal is stirred for 50 to 72 hours at 45 to 55° C. in the presence of lactobacillus bacteria, and at the same time, is fermented, thereby preventing acidification.

Also, a method for preparing a feed composition using perilla meal according to the present invention includes 1) preparing 20 to 40 parts by weight of roughage containing at least any one of oats or rice straws, 2) preparing 6 to 8 parts by weight of perilla meal, the perilla meal is shredded to have a diameter of 1.5 to 2.5 mm, at least any one of sugars, salts, and molasses is added to the perilla meal, and the perilla meal is stirred for 50 to 72 hours at 45 to 55° C. in the presence of lactobacillus bacteria, and at the same time, is fermented, 3) preparing 20 to 55 parts by weight of at least any one or more additional ingredients of grains, salts, minerals, and calcium carbonate, 4) preparing 0.5 to 1.5 parts by weight of probiotics, 5) producing a mixture by mixing the roughage, the perilla meal, the additional ingredients, and the probiotics, and 6) fermenting and aging the mixture.

Further, in 6), it is preferable the fermenting and aging are performed for 28 to 32 hours from the day when the probiotics are added.

According to the present invention, differently from the conventional case, and unlike the current livestock farming situation where the ratio of omega-3 to omega-6 fatty acid in domestic (in this case, Republic of Korea) livestock is 1:8 to 1:27, there is an effect that from 6 months after feeding to livestock, all of the livestock products are produced with the ratio of omega-3 to omega-6 fatty acid being 1:4 or less which is a recommended ratio of the World Health Organization (WHO).

Further, differently from the conventional case, it has an effect to prevent acidification of the perilla meal, which is a key ingredient, thereby being able to provide safe feeds to livestock.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a view illustrating a nutrients analysis for perilla meal of a feed composition using the perilla meal according to the present invention;

FIG. 2 is a view illustrating fatty acid analysis for perilla meal of a feed composition using the perilla meal according to the present invention;

FIG. 3 is a view illustrating a formulation ratio of a feed composition using the perilla meal according to the present invention;

FIG. 5 is a view illustrating an analysis of fatty acid of a feed composition for FIG. 5;

FIG. 6 is a view illustrating a component analysis according to the formulation of FIG. 5;

FIG. 7 is a view illustrating changes in unsaturated fatty acid after feeding of a feed for FIG. 5;

FIG. 9B is a view illustrating a result table of a cattle carcass grading issued on Oct. 13, 2015.

DETAILED DESCRIPTION OF THE DISCLOSURE

Figure 4:
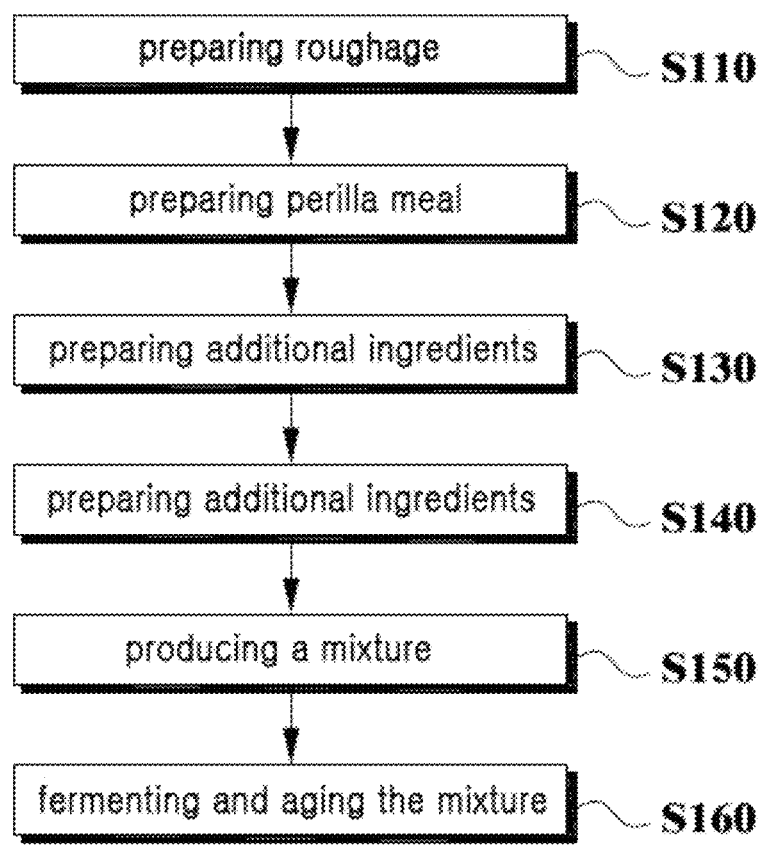
FIG. 4 is a flowchart illustrating a method of preparing a feed composition using perilla meal according to the present invention.

Hereinafter, a feed composition (hereinafter, simply referred to as a 'feed composition') using perilla meal according to a preferred embodiment of the present invention will be described in detail with reference to the accompanying drawings. Prior to the description, it is noted that the feed composition according to the present invention means feeds fed to livestock such as cattle, milk cattle, pigs, etc. without a tannin component, and does not mean feeds used for livestock such as a deer, etc.

In other words, the feed composition according to the present invention cannot be used as feeds for deer since the deer do not eat well when feeding feeds without a tannin component. It is noted that the deer can also be fed using a composition having the tannin component in additional ingredients described below.

First, as shown in FIGS. 1 and 2, the feed composition of the present invention is intended for use as a feed for livestock by mixing perilla meal which is a core composition, separate roughage, additional ingredients, and probiotics. In particular, nutrients of the perilla meal contain various nutrients such as moisture, crude protein, crude fat, crude fiber, crude ash, calcium, phosphorus, etc.

As can be seen in the data for fatty acids of the perilla meal, when analyzing a fatty acid composition per 100 g of the perilla meal in gram (g), 6.81 of almitic acid is contained, 2.83 of stearic acid is contained, 0.00 of capric acid is contained, 0.01 of lauric acid is contained, 0.04 of myristic acid is contained, and so on. The total amount of saturated fatty acid is 9.43%, and it is very low. As a typical unsaturated fatty acid, 58.05% of linolenic acid ($\omega$-3) is contained, 15.60% of linoleic acid ($\omega$-6) is contained, and 16.04% of oleic acid is contained. The total amount of unsaturated fatty acid including other unsaturated fatty acids which are not mentioned above is 90.07%, and thus, it can be seen that it is a very excellent raw material.

Further, as shown in FIG. 3, the feed composition according to the present invention can be used as feeds for all livestock belonging to a fattening period and a milking period. It can be seen that for composition ratio thereof, 20% to 40% of the roughage, 3% to 11% of the perilla meal, 20% to 55% of the additional ingredients, and 0.5% to 1.5% of the probiotics, respectively are formulated.

In this regard, it is preferable that one or more varieties of oats or rice straws may be used as the roughage, and the additional ingredients consist of a mixture of one or more of grains, salts, minerals, and calcium carbonate.

In addition, the feed composition according to the present invention having the composition ratio described above is fermented and aged for 28 to 32 hours after the addition of the probiotics. Before a fermenting and aging period as described above, the probiotics, i.e., microorganisms may not be sufficiently propagated, or after the fermenting and aging period as described above, it can be accompanied by a rotten smell due to overgrowth of the microorganisms. Therefore, by fermenting to belong to the fermenting and aging period as described above, it may contribute to the fermentation effect as well as the digestion and absorption capacity of the livestock.

Also, the original perilla meal is a lump of a circle. Therefore, it is preferable to use perilla meal which is crushed to a set size using a shredder.

In this regard, the set size of the perilla meal is determined in consideration of the fact that it should be a suitable size to be fermented and aged after the probiotics are added and mixed, and it should be crushed to such an extent that it is easy to feed the livestock to be fed. According to many years of testing in the livestock industry field, it is typically preferable to crush the perilla meal to a diameter of 1.5 to 2.5 mm or less.

In addition, after shredding, the perilla meal will be acidified in the summer when the temperature rises sharply, and thus, one needs to be particularly careful on raw material management. The perilla meal should be one that does not cause rancidity. Unacidified perilla meal should be used. In order to prevent acidification of the perilla meal, lump-shaped perilla meal to be shredded and lactobacillus (lactic acid bacteria) should be shredded together. Moreover, after shredding, it is necessary to have an aging period for fermentation for about 50 to 72 hours at the same time as stirring, thereby preventing the acidification of the perilla meal.

In this regard, in order to maximize the prevention of acidification, by aging the perilla meal including at least one constituent of sugars, salts, and molasses, it is provided a nutrient that lactobacillus can be actively activated. The temperature required for fermenting and aging is a temperature within about 45 to 55° C. By maximizing the effect of acidification prevention by means of fermenting the perilla meal at the same time as stirring, the balance of omega fatty acid can be kept at 1:4 or less by the ratio of saturated fatty acid.

The probiotic, i.e., probiotics consisted of microorganisms necessary for fermentation, are mixed for the purpose of increasing the digestive power and fermentation power of livestock.

In addition, the feed composition according to the present invention can be used in both milk cattle in the fattening period (a period fattening male cattle after 20 months of birth) and milk cattle in the milking period (a duration that breast milk comes out of milk cattle after giving birth calves). Further, when the additional ingredients constituting the mixture are grains, it can be added more in the fattening period than the milking period, because nutrients that grains have play a big role to fatten the livestock. If the milk cattle is too fattened in the milking period, it may happen that the calves cannot be fed enough milk due to the contraction of mammary glands of the milk cattle, i.e. glandula mammaria. Therefore, it is desirable for the milk cattle in the milking period to be supplied with a smaller amount of grains to be used as the additional ingredients than the cattle in the fattening period.

In this regard, it is preferable that the amount of the grains to be used during the milking period is about 20% to 30% or less of the amount of the grains to be used during the fattening period.

Hereinafter, a method of preparing a feed composition (hereinafter, simply referred to as a 'method of preparing a feed composition') using perilla meal according to a preferred embodiment of the present invention will be described in detail with reference to the accompanying drawings.

First, as shown in FIG. 4, the method of preparing the feed composition according to the present invention consists of a preparation method including preparing 20 to 40 parts by weight of the roughage (S110), preparing 6 to 8 parts by weight of the shredded perilla meal (S120), preparing 20 to 55 parts by weight of the additional ingredients (S130), preparing 0.5 to 1.5 parts by weight of the probiotics (S140), forming a mixture (S150), and fermenting and aging the mixture (S160).

In this regard, it is preferable that, in the fermenting and aging, the mixture is fermented and aged for 28 to 32 hours from the day when the probiotics are added. Because, before a fermenting and aging period as described above, the microorganisms may not be sufficiently propagated, or after the fermenting and aging period as described above, it can be accompanied by a rotten smell due to overgrowth of the microorganisms. Therefore, by fermenting to belong to the fermenting and aging period as described above, it may contribute to the fermentation effect as well as the digestion and absorption capacity of the livestock.

According to the fatty acid of the feed composition prepared by the method of preparing a feed as described above, as can be seen in an analysis table shown in FIG. 5, when analyzing a fatty acid composition per 100 g of the feed composition in grams (g), as saturated fatty acids, 12.67 of palmitic acid is contained, 2.39 of stearic acid is contained, 0.00 of capric acid is contained, 0.1 of lauric acid is contained, 0.27 of myristic acid is contained, etc. Also, it can be seen that the total amount of saturated fatty acids is 16.36%. As unsaturated fatty acids, 25.97% of linolenic acid ($\omega$-3) is contained, 28.38% of linoleic acid ($\omega$-6) is contained, and 20.98% of oleic acid is contained. Also, it can be seen that the total amount of unsaturated fatty acids including other unsaturated fatty acids which are not mentioned above is 76.39%.

Therefore, the ratio of omega-3 fatty acid to omega-6 fatty acid is 1:1.08, and the ratio of the omega-3 fatty acid to the omega-6 fatty acid is adjusted to 1:4 or less. According to this, one may find the ratio of omega-3 fatty acid to the omega-6 fatty acid in the feed composition prepared by the method of the present invention.

In addition, as shown in FIG. 6, it can be seen that a component according to formulation of the feed composition during the fattening period (including the milking period) contains 43.33% of moisture, 9.13% of crude protein, 3.60% of crude fat, 11.44% of crude fiber, 5.30% of crude ash, 0.49% of calcium, 0.40% of phosphorus, etc. It can be seen that other soluble proteins, degradable protein, and the like are also variously contained as shown in the table.

Hereinafter, the performance of the feed composition prepared by the method of preparing a feed according to the present invention will be confirmed by the listed data, etc.

Figure 8:
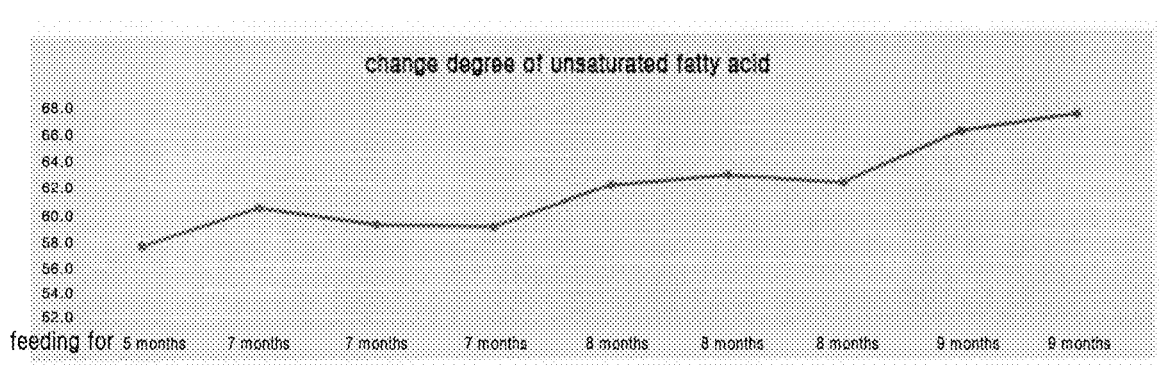
FIG. 8 is view illustrating a graph showing changes in unsaturated fatty acid according to a feeding period for FIG. 7.

First, according to changes in the unsaturated fatty acid after feeding a feed of the present invention with reference to FIGS. 7 and 8, after 6 months of feeding the feed composition, 57.4% of unsaturated fatty acid is contained, after 7 months of feeding the feed composition, 60.2%, 58.9%, and 58.7% of unsaturated fatty acid are contained, after 8 months of feeding the feed composition, 61.7%, 62.4%, and 61.8% of unsaturated fatty acid are contained, after 9 months of feeding the feed composition, 65.6% and 66.8% of unsaturated fatty acid are contained. That is, the content of unsaturated fatty acid gradually increased according to a period of feeding.

According to the result of this experiment, it can be seen as a demonstration that the perilla meal has affected the increase of unsaturated fatty acid.

After that, the feed composition was fed, and products, i.e., meat, milk etc. were analyzed, but the increase in the content of unsaturated fatty acid was insignificant after 10 and 11 months of feeding the feed composition.

In this regard, the numerical value at the end of the lower end of FIG. 7 is the ratio of $\omega$-3 to $\omega$-6. According to the ratio of $\omega$-3/$\omega$-6 in the last line of the lower end of FIG. 7, the ratio of $\omega$-3/$\omega$-6 after 6 months of feeding the feed composition is 1:3.74, the ratios of $\omega$-3/$\omega$-6 after 7 months of feeding the feed composition are 1:3.74, 1:2.72, 1:3.26, and 1:1.91, the ratios of $\omega$-3/$\omega$-6 after 8 months of feeding the feed composition are 1:2.97, 1:2.84, and 1:5.2, and the ratios of $\omega$-3/$\omega$-6 after 9 months of feeding the feed composition are 1:2.48 and 1:3.01.

According to the result of this experiment, it can be seen that the fatty acid ratio of omega-3 ($\omega$-3) to omega-6 ($\omega$-6) is adjusted to 1:4 or less in most experimental livestock. In other words, it can be seen that the ratio of $\omega$-3/$\omega$-6, i.e., the balance, have been definitely affected.

Figure 9A:
FIG. 9A is a view illustrating test results of Oct. 20, 2015.

In addition, as shown in FIGS. 9A and 9B, according to the test result report of fat samples issued by the Institute of Agricultural Science of Chungnam National University, after feeding the feed, 44.25 of oleic acid (omega 9) is contained, 3.86 of linoleic acid is contained, 1.03 of linolenic acid is contained, etc. As shown in the table, since the ratio of omega-3 fatty acid to omega-6 fatty acid is 1:3.74, it can be seen that the feed shown is a feed having the above ratio adjusted to 1:4 or less.

As a result, it can be seen that a cattle carcass grade is determined as a Republic of Korean native cattle 1+B grade in the absence of defects in work station name Bak Dal Jae LPC (see no. 1 in the table of FIG. 9*b*), a Republic of Korean native cattle 1B grade in the absence of defects in work station name Bak Dal Jae LPC (see no. 2 in the table of FIG. 9b), and a Republic of Korean native cattle C grade in the absence of defects in work station name Bak Dal Jae LPC (see no. 3 in the table of FIG. 9b).

Figure 10:
FIG. 10 is a view illustrating a test result report according to a sample name Natural I issued on Nov. 12, 2015.

In addition, as shown in FIG. 10, according to the test result report for a sample name Natural I issued by the Institute of Agricultural Science of Chungnam National University on Nov. 12, 2015, after feeding the feed, 20.98 of oleic acid is contained, 28.38 of linoleic acid is contained, 25.97 of linolenic acid is contained, etc. As shown in the table, since the ratio of omega-3 fatty acid to omega-6 fatty acid is 1:1.08, it can be seen that the feed shown is a feed having the above ratio adjusted to 1:4 or less.

As such, according to the feed composition of the present invention, typically, unlike the current livestock farming situation where the ratio of omega-3 to omega-6 fatty acid in domestic (in this case, Republic of Korea) livestock is 1:8 to 1:27, there is an effect that from 6 months after feeding to livestock, all of the livestock products are produced with the ratio of omega-3 to omega-6 fatty acids being 1:4 or less which is a recommended ratio of the World Health Organization (WHO).

Moreover, unlike the fact that the content ratio of unsaturated fatty acid in domestic (in this case, Republic of Korea) livestock products such as meat, eggs, milk, etc. is over 43%, as a result of feeding the feed composition of the present invention to livestock, after 6 months, the content of unsaturated fatty acid began to exceed 55%. Particularly, after 8 months, there is another effect of producing high-quality livestock products with the content of unsaturated fatty acid of 60% or more.

In this regard, among fatty acids, an arachidonic acid is an inflammatory fatty acid, and it is a fatty acid that reduces the immunity of the body. Particularly, after 8 months of feeding the feed composition of the present invention to livestock, there is a peculiar effect of completely removing the content of the arachidonic acid in livestock products.

In addition, there is an effect that the acidification of the perilla meal may be prevented thereby providing the livestock with a safe feed.

The specific embodiments of the present invention have been described above. However, it is to be understood by one of ordinary skill in the art that the scope and spirit of the present invention are not limited to these specific embodiments, and that various changes and modifications may be made within the scope of not changing the teaching of the present invention.

Accordingly, the above-described embodiments are provided so that one of ordinary skill in the art can fully understand the scope of the present invention. Therefore, it should be understood that the invention is illustrative and not restrictive in all aspects, and the invention is defined only by the scope of the claims.

What is claimed is:

1. A method of preparing a feed composition, the method comprising:
   1) providing 20 to 40 parts by weight of roughage containing at least one of oats or rice straw;
   2) preparing 6 to 8 parts by weight of perilla meal comprising:
      shredding the perilla meal to have a diameter of 1.5 to 2.5 mm,
      adding at least one of sugar, salt, and molasses and stirring and simultaneously fermenting the perilla meal with the at least one of sugar, salt, and molasses for 50 to 72 hours at 45 to 55° C. in the presence of lactobacillus bacteria,
   3) providing 20 to 55 parts by weight of one or more additional ingredients selected from the group consisting of grain, salt, mineral, and calcium carbonate;
   4) providing 0.5 to 1.5 parts by weight of probiotics;
   5) producing a mixture by mixing the roughage, the perilla meal, the additional ingredients, and the probiotics; and
   6) fermenting and aging the mixture for 28 to 32 hours;
   wherein the feed composition prepared by the method has a ratio of omega-3 fatty acid and omega-6 fatty acid of 1:4 or less; and
   wherein the feed composition prepared by the method is fed to livestock for 8 months to provide meat, eggs or milk having a ratio of omega-3 fatty acid and omega-6 fatty acid of 1:4 or less and having a content of unsaturated fatty acid of 60 wt. % or more based on a total fatty acids content.

* * * * *